(12) United States Patent
Zolliker et al.

(10) Patent No.: US 6,498,638 B1
(45) Date of Patent: Dec. 24, 2002

(54) OPTIMIZATION APPARATUS FOR PHOTOGRAPHIC IMAGE DATA

(75) Inventors: Peter Zolliker, Dielsdorf (CH); Walter Kraft, Zürich (CH)

(73) Assignee: Gretag ImagingTrading AG, Wettingen (CH)

( * ) Notice: Subject to any disclaimer, the term of this patent is extended or adjusted under 35 U.S.C. 154(b) by 105 days.

(21) Appl. No.: 09/710,788

(22) Filed: Nov. 10, 2000

(30) Foreign Application Priority Data

Nov. 11, 1999 (DE) .......................... 199 54 353
Mar. 9, 2000 (EP) ............................ 00104491

(51) Int. Cl.[7] .................. G03B 27/32; G03B 27/52; B41J 2/205; B41J 2/21; H04N 1/46
(52) U.S. Cl. .................. 355/32; 355/40; 347/15; 347/43; 358/501; 358/502; 358/530; 358/515
(58) Field of Search ..................... 355/32, 40; 347/15, 347/43; 358/501, 502, 530, 515

(56) References Cited

U.S. PATENT DOCUMENTS

| 5,119,125 A | 6/1992 | Kraft ........................... 355/38 |
| 5,365,353 A | 11/1994 | Kraft ........................... 358/518 |
| 5,528,339 A | * 6/1996 | Buhr et al. |
| 6,068,361 A | * 5/2000 | Mantell |
| 6,141,441 A | * 10/2000 | Cass et al. |
| 6,159,294 A | 12/2000 | Kuster et al. ............... 118/642 |

FOREIGN PATENT DOCUMENTS

| EP | 0 475 897 A1 | 3/1992 |
| EP | 0 586 772 A1 | 3/1994 |
| EP | 0 586 773 A1 | 3/1994 |

* cited by examiner

*Primary Examiner*—Russell Adams
*Assistant Examiner*—Khaled Brown
(74) *Attorney, Agent, or Firm*—Weingarten, Schurgin, Gagnebin & Lebovici LLP (57) ABSTRACT

Optimization apparatus for photographic image data with a data input device for input of first image data which are present in a first color space and represent a photographic image or a set of photographic images, an optimization device for optimizing the first image data and a data output device for output of the optimized first image data which optimally represent the photographic image or the set of photographic images, whereby the optimization device carries out an optimization transformation on the first image data, whereby the optimization transformation corresponds to a combination of at least the following transformations: a first transformation which transforms the first image data from the first color space into another, second color space; a correction transformation, which corrects the transformed first image data in the second color space; and a second transformation which transforms the corrected first image data into a third color space.

10 Claims, 5 Drawing Sheets

OPTIMIZATION APPARATUS FOR PHOTOGRAPHIC IMAGE DATA

FIELD OF THE INVENTION

The present invention relates to optimization apparatus for photographic image data with a data input device an image data optimization device and an output device. It further relates to a photographic copier or printer with an optimization apparatus and a process corresponding to the optimization apparatus and a program for carrying out the process.

The term "photography" as used herein refers to the (especially permanent) capturing of images produced by electromagnetic radiation (especially light) with means suited therefor (for example photographic apparatus with film, digital photographic camera with CCD chip, film camera, video camera and so on).

The field of the present invention relates to the processing of photographic image information, which represents the photographically produced image. The photographic image information, for example, is conventionally captured or stored on a film. The photographic image information so stored can then be converted into digital photographic image data, for example by way of a scanner. But, the photographic image information can also be only digitally captured right from the start, for example by way of a digital camera. It can then be electronically stored, for example, (CD-ROM, DVD) and can, for example, be transmitted through a network (for example LAN or Internet).

BACKGROUND ART

The present invention relates to the processing of photographic image data (in the following also called first image data) which represent images produced by photography. The photographic image data are processed with a data processor in such a way that they are suited for picture production. The picture production can thereby be carried out, for example, on a monitor, on (light sensitive) photographic paper by suitable exposure or by way of a printer or by way of another photographic copier apparatus. However, the quality of the representation of the photographic image data is often unsatisfactory whether done conventionally, for example, on photographic paper or as slide or by way of a monitor (for example LCD screen or TV screen) or printer.

A significant cause for the unsatisfactory quality resides in the capturing and storage of the images or the photographic image information. The causes herefor reside, for example, in the optical capturing of the image by the camera, namely, for example, in the quality of the lens system, in the operation of the camera by the user, namely, for example, incorrect exposures, in the quality of the image capturing means, namely the film or the CCD, in the illumination of the photographic object, and so on. The less than optimal conditions during the image capturing and storage of the photographic image information result in so-called color shifts, which means a fixed, preselected color shade is differently captured and stored depending on the color density or brightness. Thus, a color shade shift results relative to the actual color shade to be represented. In other words, the captured and stored image information does not correspond with respect to the color values to the color values of the photographed object. If the photographic image information is further processed prior to producing a picture, for example, by scanning a film with a scanner, this can result in further changes of the color values.

The photographic image data are conventionally obtained from photographic image information by way of color filters. This is the case for example, with a scanner but also with the digital photographic camera. The data so obtained describe thereby the intensity of different colors of an image point. Conventionally, the representation is done with so-called RGB image data in the so-called RGB color space, or by RGB stands for red, green and blue. Respectively one coordinate of the color space is thereby reserved for one color, i.e. for red, green or blue.

SUMMARY OF THE INVENTION

It is an object of the invention to optimize photographic image data, such as, for example, the RGB image data. This means that errors made during the photographic capturing and/or storage and/or processing of the photographic image information (especially color value changes) should be reversed, if possible.

This object is achieved by the features of the independent claims. Preferred embodiments are apparent from the dependent claims.

Preferably an optimization apparatus is provided in accordance with invention which optimizes (digital) photographic image data. The optimization apparatus carries out an optimization transformation. The optimization transformation corresponds to a combination of a first transformation which brings the first image data from the first color space into the second color space, the above described correction transformation and a second transformation, which transforms the first image data corrected in the second color space into a third color space, which is suited for the picture production. The third color space may correspond to the first or second color space or may be any other color space. The third color space may also be different from the second color space. The process in accordance with invention also carries out such an optimization transformation together with the improvements described below. The program in accordance with invention is able to run especially on the computer or a workstation and carries out the process steps in accordance with invention.

The optimization apparatus includes a (digital) data input device for the input of first image data which are the photographic image data. The data input device can be, for example, a data interface, a modem or a scanner. If it is a scanner, the first (photographic) image data are, for example, captured by scanning a film which represents the photographic image information to be processed. Alternatively, the first image data can also be obtained, for example, through a network. These first image data are present in a first color space. Typically, this is a color space wherein the coordinates respectively describe one color i.e., for example, the RGB color space. The first image data represent an image or several images which have been photographically captured. Subsequent to the data input device is the optimization device in accordance with invention in which the first image data are optimized. Subsequent to the optimization device is then the data output device in order to output the optimized first image data which now optimally represent the image or the images. The data output device can also be a data interface for a modem. The data interface is, for example, connected with a computer or a photographic copier or with a network. However, the data output device can also be a picture producing device, which on a medium produces a picture based on the image data. For example, it can be a printer which based on image data prints the optimized picture. The printing can be carried out, for example, on normal paper or light sensitive paper by suited printers or other photographic copiers. The optimized first image data thereby describe image information which is processed by the data output device. This processing can include especially an adaptation and thereby change of the optimized first image data with regard to the output apparatus. Depending on whether the image data are intended for a monitor or printer of a specific type and depending on the dynamic range of the output medium (photographic paper, normal paper, monitor) the optimized image data can be manipulated and adapted to the dynamic range in order to achieve the best compromise with regard to the output medium. For example, the optimized image data can be digitally overlaid with a mask which brightens or darkens certain image regions in order to carry out an adaptation to the output medium and to the subjective human observation capabilities.

For optimization of the first image data, the latter must be corrected. The inventors have found that it is of significant advantage for the execution of such a correction when it is described by a transformation which corresponds to a correction which is carried out in another color space suited for the correction. The first image data to be optimized are present in a certain color space before the optimization which is in the following referred to as "first color space". The color values in the first color space described by the individual first image data are to be changed by the optimization. This change is preferably carried out by an optimizing transformation. In order that the optimizing transformation uses the advantage of a correction in a suitable color space, the optimizing transformation preferably corresponds to a combination of transforms, namely a so-called first transform, the mentioned correction transform and a so-called second transform, which have the properties described in the following.

The first transform transforms the first image data to be optimized from the first color space into the other, second color space suited for the correction. When the first image data are then found in the second color space, which is different from the first color space, a correction transform is carried out therein, which corrects the first image data within the second color space. When the first image data are corrected, they are transformed by a second transform into a third color space, which is especially different from the second color space and suited for the image reproduction (for example, photographic copier, monitor). In particular, the third color space is again the same color space as the first color space or a standard color space, such as, for example, sRGB or Lab. However, the transformation into the standard color space can also be carried out in a separate step, as described further below. If the first image data are, for example, in the RGB color space, and if the printout is to be carried out by way of a color laser printer including cyan, magenta, yellow and black toner, the transformation can be carried out in a corresponding CMYK color space ("C" for cyan, "M" for magenta, "Y" for yellow and "K" for black). If the print production is carried out, for example, by exposure of photographic paper to differently colored lasers of three different wavelengths, the transformation can be carried out in a third color space the coordinates of which describe the wavelengths of the 3 lasers.

By transformation of the image data to be processed for the print production into a color space suited for the correction, optimal correction results can be achieved with little processing cost.

The correction transformation in the second color space corresponds preferably to a transform which includes a rotation and/or shear in this second color space. In particular, errors during the photographic capturing, especially errors in the color values (for example, color shift errors), can be corrected with this rotation. Preferably, the second color space is selected such that at least one coordinate describes the color density of the color. This has proven especially advantageous for carrying out a correction, especially when a color density transformation, in particular a rotation and/or shear and/or shift of the coordinate origin is used for the correction or if the color density transformation supports the correction. The color density transformation, especially rotation or shear, is preferably structured such that image data which represent a gray value or gray shade are after the color density transform closer to and/or at a smaller distance from the axis which describes the color density in the second color space (see also FIG. 5 of EP 0 586 772 A1 and description). Preferably a determination of the correction transformation is not carried out based on the first image data to be corrected, in particular because of the large data volume of these first image data. Preferably, the determination of the correction transform and especially the rotation is carried out based on the analysis of second image data. Although these second image data can be directly connected with the first image data (for example, statistically correlated therewith), they cannot be transformed into the first optimized image data because of their information content which is different from the one of the first image data. This is in particular due to the reduced local resolution, as will be described further below.

Preferably, not only a simple offset correction is carried out in the correction transform but a multidimensional correction or transform, and in particular the above-mentioned rotation or shear is carried out.

As mentioned, the correction transformation is preferably based on the analysis of second image data which preferably are also present in the second color space. Based on this analysis, which is in particular a statistical analysis of the second image data, the correction, in particular a multidimensional transformation or rotation, is then carried out in the second color space.

The second image data preferably have a significantly smaller data size than the first image data to be corrected in order to so minimize the processing cost for the analysis and the correction. In particular, the second image data have a significantly smaller local resolution than the first image data. Preferably, the second image data represent the image or images, which are also represented by the first image data. They at least represent a part of the image or images. Thus, a (statistical) correlation preferably exists between the first image data and the second image data. The second image data can be in particular image data which have proven a suitable basis for an analysis and correction. They can be continuously improved throughout the period of operation of the optimization apparatus. In particular, different second image data can be used depending on the type of the first image data to be processed, which means the film type used, the camera type used, and so on.

If the second image data are at least partly obtained from the same photographic image information as the first image data, this can take place independent of the extraction of the first image data or the second image data can be derived from the first image data. An independent extraction of the second image data is for example the scanning of a picture (for example film), which is the basis of the first image data, by a separate scanner, which in particular can have a higher spectral (but lower local) resolution than a scanner which is used for the extraction of the first image data.

If the second image data are obtained from the first, the first image data are therefor transformed in the second color space. Furthermore, a reduction of the local resolution preferably takes place in order to minimize the data volume for the analysis, based on the second image data.

The data volume and/or the local resolution of the second image data is preferably at least one order of magnitude below the data volume of the local resolution of the first image data, which are corrected based on the second image data, more preferred is a data volume or local resolution which is at least two orders of magnitude smaller and especially preferred is a data volume or local resolution which is at least three orders of magnitude smaller. A local resolution of less than 10,000 image points per image for the second image data and especially of the magnitude of about 1,000 image points has proven sufficient.

Processes are used for the analysis and correction, which are known from EP 0 586 773 A1 or U.S. Pat. No. 5,365,353, which are both incorporated herein by reference. However, no optimization takes place therein of the data to be processed for the image reproduction, but a determination of control data for the control of an exposure unit based on image data. A transformation of the control data from the color space in which the correction is carried out to another color space suited for the image reproduction does not take place. The actual image reduction is carried out by exposing a film onto a photographic paper. Especially, in contrast to the present invention, the image information to be reproduced (and stored on the film) is not transformed into (digital) image data or input as digital image data which are then subjected to the optimization transformation in accordance with invention.

Furthermore, in contrast to the processes described in the above-mentioned references, those data which are corrected are preferably not also used for the basis of the analysis. Preferably, a special data set, namely the already mentioned second image data, is produced which is then used as a basis for the analysis, whereby the result of the analysis is then not used for the correction of the second image data, but for the correction of the first image data which are present in particular in high resolution.

As is known from EP 0 586 773 A1 or U.S. Pat. No. 5,365,353, corrections can be carried out which are based on a statistical analysis of one set of images or on a statistical analysis of a single image. The set of images is thereby selected such that a statistical correlation between the images results, for example on the basis of the same film being used or the same camera being used. The second image data are therefore based in this case both on the image presently to be transformed as well as on a set of images in which the image presently to be transformed is included.

Through the correlation between the first and second image data all first image data which represent a certain image are therefore associated with a certain correction transformation.

Several correction transformations can also be used for the correction of first image data which represent a single image. This can be an advantage especially when the image has several dominant areas which greatly vary with respect to brightness and/or color shade. In that case, different correction transformations optimally suited for the respective region of the image can be determined and used in the optimization transformation.

As already mentioned above, undesired changes of the color values of the individual image points can be caused during the photographic recording and/or storing of the photographic image information. The data input device, especially a scanner, can also cause further undesired changes, especially when the scanner has a so-called color shift. The variance properties can be exactly measured for each scanner, for example, by way of color tables. However, it is necessary to carry this out for all color shades and color density levels. As a result of these measurements, a so-called profile of the data input device is obtained, especially of the scanner, for example, in matrix form or in the form of a table. Based on this profile, each individual image point of the first image data can then be corrected so that the variance properties of the input device can be equalized or reversed.

Alternatively, the second image data can be obtained from the first image data through a compensation transformation of the reduced first image data in the second color space. This compensation transformation is based preferably on a statistical analysis of reduced first image data, which represent a multitude of images input through the data input device and which reflect the color value variance properties of the data input device. The color value variance properties of the data input device are at least about equalized through the compensation transformation. A Karhunen-Loève-Transformation can be used, for example, as compensation transformation. If the data input device is a scanner, a multitude of different film types and image types are preferably scanned in order to obtain base data for the analysis.

For data input devices which are constructed as a data interface, and which do not change the image data or image information, it is not necessary to generate a profile for the data input device or to use a compensation transformation. One can forego the profile even with a scanner, but at the expense of the data output quality.

Once first image data have been obtained in the manner mentioned above, which data are free of influences of the data input device, they are then advantageously subjected to the optimization transformation, or the processing operations for clearance of the first image data from these influences are included in the optimization transformation. For example, the first transformation can be implemented by the mentioned compensation transformation. Subsequently, the transformation from the first color space into the second color space takes place as well as the clearance of the first image data from influences of the data input device. Subsequent to the optimization transformation, another transformation into a standard color space, for example, sRGB or Lab, can take place, which is adjusted to the human eye or the human color perception and is independent of the output apparatus. With this transformation into the standard color space, a dynamic range and a gradation of the transformed image data can be achieved which are adapted to an average paper. An alignment of the dynamic range and gradation can subsequently take place. Such a transformation into the standard color space is carried out especially when the input first image data originate from a film. The dynamic range of a photographic paper, for example, is substantially smaller than the dynamic range of a film with which the photographic image information was captured. Especially the gradation of the photographic paper must be taken into consideration. In contrast, a transformation into the standard color space may not be necessary, when the first image data originate from a digital camera. Subsequent to the optional transformation into the standard color space, an adaptation of the optimized and standardized first image data to the output medium can be carried out. The same applies, albeit to a lesser degree, when the data are to be displayed on a monitor. The image data prepared in this way for a specific output can then be transferred to the output device or stored on a storage medium or transferred through a network (for example Internet) to a data receiver.

It is especially preferred to shape the second image data in such a way that they are free of influences from the data input device. Preferably, this applies especially also to the first image data transformed by the first transformation.

The first and second transformation can be determined depending on whether, for example, the second image data are obtained independent from the first image data, or whether they are obtained from the first image data before or after the reduction of the image data and before or after the application of a profile. The different variants are described in the following by way of a digital system and a hybrid system.

BRIEF DESCRIPTION OF THE DRAWINGS

Further features essential to the invention are thereby disclosed during the description of the different embodiments. Especially, features of the individual embodiments can be combined.

DETAILED DESCRIPTION OF THE PREFERRED EMBODIMENT

Figure 1:
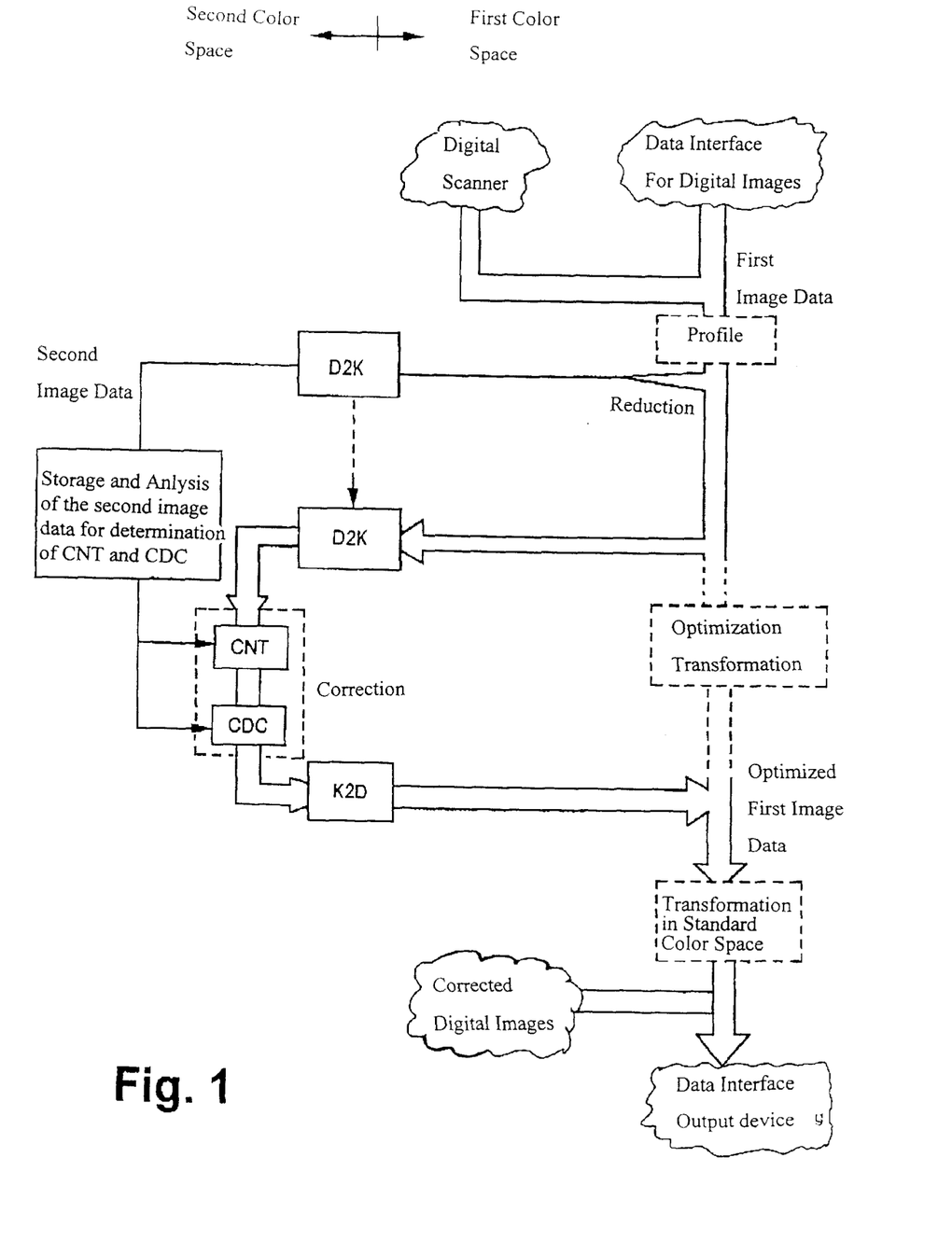
FIG. 1 shows a digital system according to a first variant.

The digital system illustrated in FIG. 1 represents a photographic copier or a photographic printer which optimizes input digital photographic image data and then outputs them on an output device.

A digital scanner is provided as data input device which, for example, scans a film. The image data obtained by scanning represent the first image data. Alternatively or additionally, a data interface can also be provided through which uncorrected digital images are input as first image data.

The first image data can be subjected to a so-called profile in order to remove systematic errors caused by the input process. In order to determine a profile, one must first measure, preferably for the whole color space, to what degree changes in the color values of the image information are caused before and after the input by the data input device. The profile is structured such that these changes are reversed. In particular, the color value variance properties of a scanner can be measured, for example, by way of standardized color tables. It is the object of the profile to produce image data which are free of influences from the data input device.

The first image data are typically high-resolution image data with more than 1 million pixels per image. This is indicated in the figures by the wide line which illustrates the high data volume.

When first image data are now given which are free of influences from the data input device, they are converted through an optimization transformation into optimized first image data. The optimized first image data are especially optimized in such a way that especially systematic errors during the photographic image capture and storage are removed. These optimized image data can then, if required, transformed into the above-mentioned standard color space and optimally also subjected to an adaptation transformation which carries out an adaptation of the optimized image data to the output device. As already mentioned, the image data can be output, for example, on a photographic paper the gradation of which must be taken into consideration. If the optimized first image data are to be sent to a client over a network or over the Internet, this can be done without further adaptation either directly or after the optimal transformation into the standard color space. Client requests can also be taken into consideration, in that client instructions are input into the photographic copier or the optimization apparatus of the present invention, which specify the output device to which the optimized first image data are to be adapted. For example, the client instructions can specify a specific color ink jet type and the paper used. The client can therefore send, for example, over the Internet, digital images together with client instructions, which are then input as first image data into the optimization apparatus through the digital interface, and then sent back again over the Internet to the client after the optimization as optimized first image data and/or standardized and/or adapted optimized image data. The just described manner of image processing by way of the optimization apparatus of the invention is, of course, not limited to the embodiment according to FIG. 1, but applies to all optimization apparatus according to the invention.

If the digital system shown in FIG. 1 includes an output device for the image reproduction on an output medium, as is the case, for example, in a photographic copier, already corrected image data, for example, images on photo CDs, can of course also be integrated into the printing process of the photographic copier, as illustrated at the bottom in FIG. 1, whereby corrected digital images can be directly sent to the output device. If these corrected digital images are not yet standardized, they can of course also be fed into the data flow described in FIG. 1 before the standardization, so that they are transformed in a standard color space.

It is further indicated in FIG. 1 that processes in the left half relate to the second color space and processes in the right half relate to the first color space. It is assumed that the first image data before and after the optimization transformation are in the first color space. As already mentioned above, the first image data which before the optimization transformation are in the first color space can also be in a third color space after the optimization transformation, which is distinguished from the first and/or second color space and which is better suited for the output of the optimized first image data.

The optimization transformation corresponds, in accordance with the invention, to a combination of several transformations, namely in particular the first transformation, the correction transformation and the second transformation. As already mentioned above, a transformation for the clearance of the image data from influences by the data input device can be incorporated into the optimization transformation, as will be discussed further below in connection with FIG. 2. The transformations can be carried out sequentially. However, a single transformation can also be formed from these transformations, namely the optimization transformation. The optimization transformation can, as is indicated by the broken line, be applied directly to the first image data. It corresponds to the combination of the mentioned transformations.

A first transformation D2K transforms the first image data, which are preferably free from influences by the data input device, into the second color space. If the first image data are not yet free from influences by the data input device, those influences can be minimized or compensated with the correction described in the following.

The first color space is typically an RGB color space, in which one color is respectively assigned to one axis of coordinates. The second color space is preferably a space wherein one axis is assigned to the color density and the other two axes define a plane which describes the color.

The first image data then found in the second color space are then subjected to a color normalization (CNT). For that, the first image data transformed into the color space are especially preferably free from influences of the data input device. The data are transformed by the color normalization in such a way that they are independent from errors during the image capture, which apply for a whole set of images or that such errors are at least minimized. If, for example, a set of pictures has been recorded with the same film, the data are transformed into a film dependent color space. If, for example, a set of images has been taken with the same digital camera, they are transformed into a digital camera-independent color space, which is independent from the type of the digital camera.

While the CNT is based on the analysis of a set of images, a further transformation (CDC) is subsequently applied which is based on the analysis of the actual image to be processed. A features extraction process and a classification strategy are thereby preferably used to estimate the best color and density correction for each individual image.

A combination of CNT and CDC forms the correction transformation. It is an essential feature of the correction transformation that it is multidimensional. In particular, not only the application of an offset or scaling takes place. The correction transformation especially causes the mentioned color density transformation, in particular a rotation and/or shear in the second color space. Undesired color shifts during the photographic image capture and/or storage and/or data input can be compensated especially with this color density transformation. After completion of the correction transformation, the corrected first image data, as in the example of FIG. 1, are transformed by K2D back into the first color space, which can in particular be an RGB color space.

The transformations D2K and K2D are preferably dedicated transformations which carry out a transformation from a dedicated first color space to a dedicated second color space and from there back to the first color space or to a dedicated color space. For determining the transformation D2K, a representative image data set is preferably formed in the second color space and a corresponding image data set in the first color space. The two image data sets are referred to as first and second test image data. They preferably represent the same images. The transformation D2K is preferably structured such that the first test image data correspond to the second test image data after the transformation when they represent the same image. This adaptation process or regression process is described further below in connection with the hybrid solution.

It is a special aspect of the present invention that the transformation which creates a relation between the first and second image data is also used in the optimization transformation. This transformation is used in particular as first transformation. The same transformation D2K as used for optimization of the first image data is therefore preferably also used in the extraction of the second image data from the first image data.

However, for the extraction of the second image data, an additional manipulation of the data takes place besides the transformation D2K, so that the second image data differ from the first image data after D2K transformation. The manipulation is a reduction of the data volume, especially preferably associated with a loss. The second image data are analyzed for determination of the correction transformation whereby the reduced data volume significantly minimizes processing. The reduction is preferably carried out before the transformation by D2K so that the transformation effort is also reduced. Thus, the first image data are preferably reduced, for example, by sub sampling or averaging. These reduced first image data are then subjected to the D2K transformation which then results in the second image data. The second image data therefore represent the same image as the first image data however at a significantly reduced resolution. A resolution of 500 to 5,000 pixels per image for the second image data has been empirically shown sufficient for the achievement of good correction results. In case a set of images belonging together, for example, from the same film, are to be optimized, the second image data are preferably stored and/or respectively appropriately updated on the basis of newly obtained second image data. An analysis of second image data therefore preferably flows into the CNT which results from a set of images. The analysis of the second image data preferably flows into the CDC, which second image data represent the same image as the first image data which are to be optimized by the optimization transformation.

Figure 2:
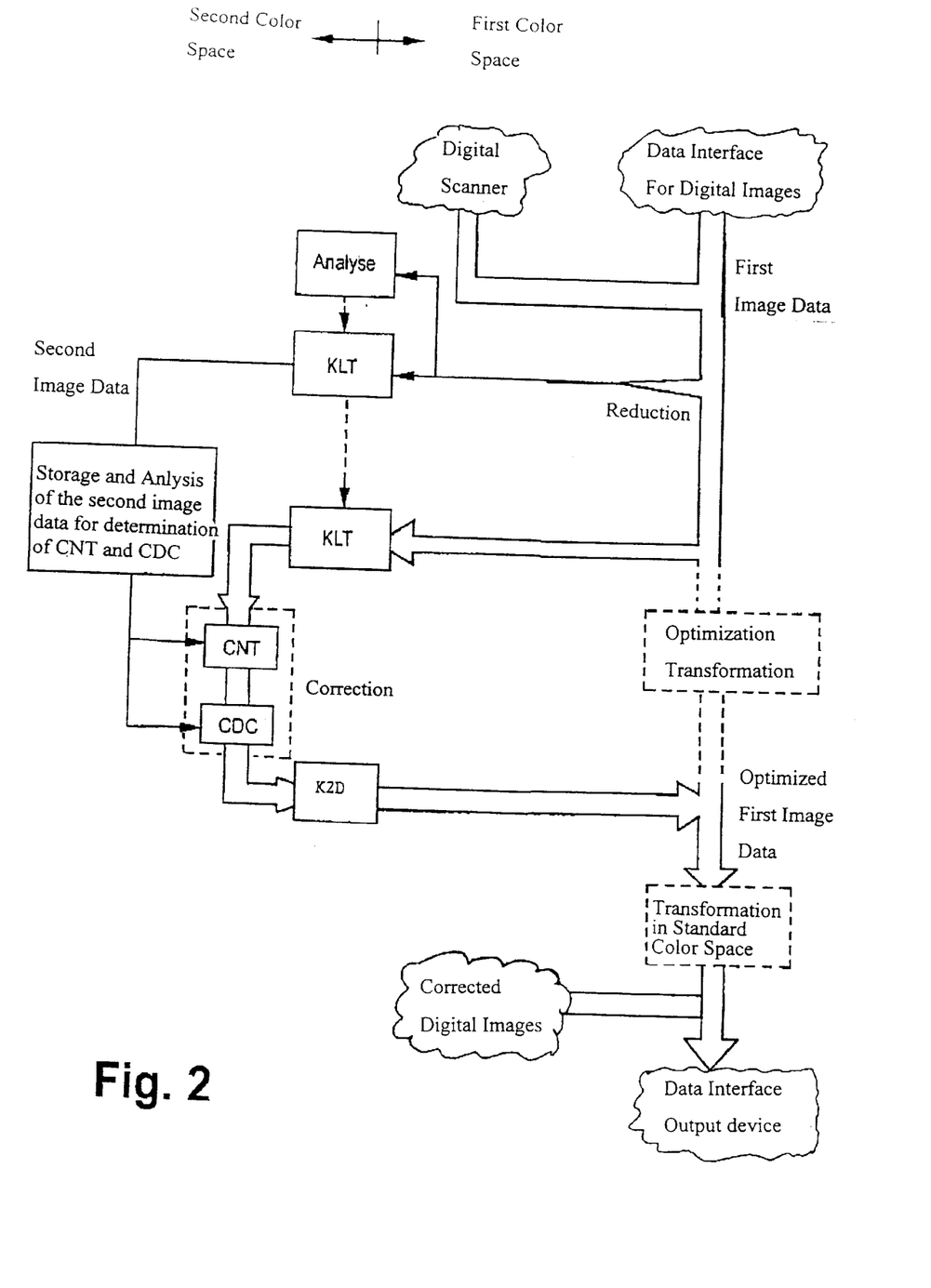
FIG. 2 shows a digital system according to a second variant.

FIG. 2 also shows a digital system or a digital photographic copier. It is differentiated in the use of a transformation which is referred to as KLT and which is based on an analysis, especially a statistical analysis of the data to be transformed. On the basis of this analysis it is possible to structure the KLT in such a way that color value variance properties of the data input device are removed or compensated. Consequently, the use of a profile is also not necessary. An example of such a transformation is the Karhunen-Loève-Transformation as described, for example, in EP 0 475 897 A1 or in "Fundamentals of Digital Image Processing" by Anil K. Jain, Prentice Hall, 1989. In the case described in FIG. 2, the second image data are also distinguished from the first image data which were subjected to the KLT. For extraction of the second image data, the first image data are first reduced (for example subsampled or averaged). The resulting data form the basis for the analysis for determination of the KLT. Once the KLT has been determined, the reduced first image data are transformed by the KLT into the second color space and there represent the second image data. The same KLT which is used for the extraction of the second image data is, in the case shown in FIG. 1, also used for the optimization transformation, as is seen in FIG. 2. Corresponding to the embodiment of FIG. 1, the second image data also serve in the embodiment of FIG. 2 as a basis for the analysis for determination of the correction transformation. The reverse transformation into the first color space is carried out by the transformation K2D known from FIG. 1. If one instead used the transformation $KLT^{-1}$ which is inverse to the transformation KLT, one would again bring about the influences of the data input device. This is generally undesired. However, the transformation KLT−1 can be used for the reverse transformation when the influences are desired or negligible.

The optimization transformation OT therefore combines all transformations which are integrated into the process. It relates to the high-resolution photographic image data, i.e. the first image data, and is described by the following equation (1) for the system shown in FIG. 1 and by the following equation (2) for the system shown in FIG. 2:

$$OT = K2D \times CDC \times CNT \times D2K \quad (1)$$

$$OT = K2D \times CDC \times CNT \times KLT \quad (2)$$

The sign "x" represents a combination operator which combines transformations in order to form a new (combined) transformation. The combination of the transformations CDC and CNT represents an example for a correction transformation. In equation (2) OT eliminates possible color change properties and, thus, fulfills the task of a profile. In equation (1) OT need not fulfill this task, since according to FIG. 1 a profile was used already prior to OT.

If the optimized first image data are output from an output device onto a paper and if the first image data are based on the scanning of a film by a digital scanner, a nonlinear transformation from the film density to an idealized paper density is preferably used, which idealized paper density includes the characteristic of an average paper. If the data are sent to a specific output device, the correct print profile can be applied.

By reference to FIG. 3, the optimization apparatus according to the invention is described in the following as part of a photographic copier which is constructed as a so-called hybrid system. A hybrid system consists of a conventional printer for service prints wherein film originals are exposed onto photographic paper, as well as a digital system for the purely digital processing of image data and for the production of index prints, and for the production of digital image data for the storage on a data carrier or for transmission across networks, which digital image data represent the same images as the service prints or index prints. Index prints show several images on a paper sheet , however with a lower resolution than service prints. In contrast to the two above described digital systems, the film in the hybrid system is not only scanned, but can also be used for the actual photographic copying process within an exposure system. Furthermore, in contrast to the digital system, two scanners are used, a digital scanner and preferably a so-called spectral scanner. The digital scanner as in the digital case is normally a scanner which includes a CCD sensor with only three color channels per pixel (RGB), but has a high local resolution of especially at least about 100,000 pixels per image (for example for index prints), typically 1 million to 10 million per image. The spectral scanner preferably has a larger number of color channels, preferably above 10, typically 35, for example. The spectral scanner therefore captures the color value of a pixel more accurately than the digital scanner. However, in contrast to the digital scanner, it preferably has a significantly lower local resolution.

Figure 3:
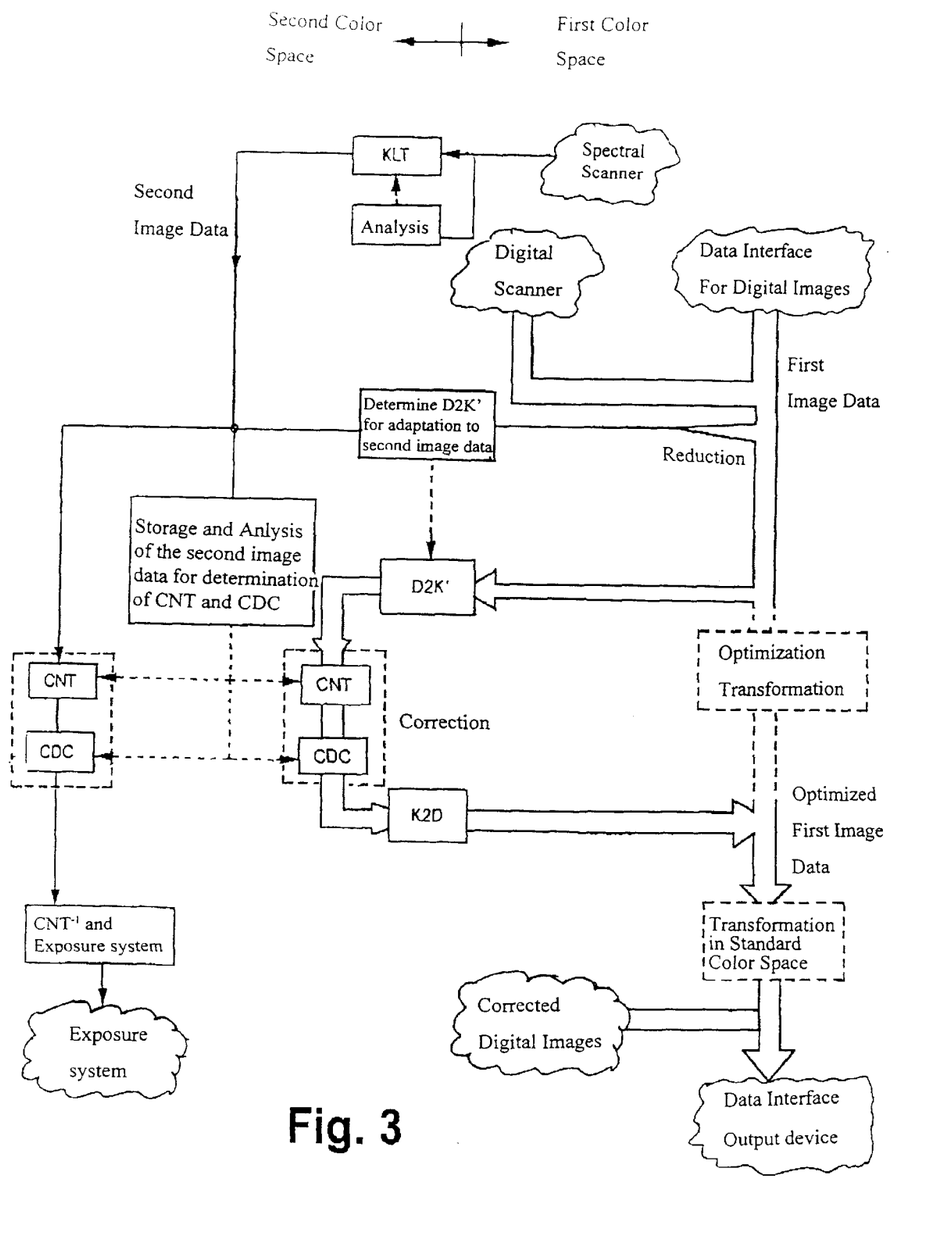
FIG. 3 shows a hybrid system.

When the color channels of the spectral scanner are different from those of the digital scanner, as described above, the spectral scanner delivers color data which, in contrast to the simple example shown in the FIG. 3, are not in the same first color space as the first image data originating from the digital scanner.

The data obtained, especially with high spectral and low local resolution, from the above-mentioned spectral scanner have proven a suitable starting point for determining a correction transformation. The image data obtained from the spectral scanner are herefor analyzed, especially statistically analyzed. The analysis is preferably based on a multitude of different film types and image types, in order to obtain a database which reflects the influences of the spectral scanner. Based on the analysis, a transformation is determined which transforms the image data of the spectral scanner into the second color space in which they are then used as second image data which are independent from the influences of the spectral scanner. The above already mentioned Karhunen-Loève-Transformation is preferably used as transformation. In accordance with the invention, an image that has already been scanned by the spectral scanner is also scanned by a digital scanner. The generation of the first image data is therefore independent from the generation of the second image data but the first image data as well as the second image data both are based on the same image or at least partially on the same images of a set of images. The second image data are analyzed as described, for example, in EP 0 586 773 and U.S. Pat. No. 5,365,353 and a result of the analysis is used for the determination of the above already described correction transformation (CNT, CDC). The correction transformation determined this way is then applied to the second image data. The resulting corrected second image data are transformed by a further transformation described in EP 0 586 773 and U.S. Pat. No. 5,365,353 into control data for the exposure of the film onto a photographic paper in an exposure system.

In accordance with the invention, the second image data are not only used for the exposure control but also for determination of the optimization transformation which optimizes the first image data.

The second image data serve especially the determination of the first transformation. Herefor, the first image data are reduced, for example, by subsampling or averaging. A transformation is then determined which transforms the reduced first image data in such a way that they correspond with the second image data after the transformation (as much as possible). A conventional regression process or adaptation process as described in more detail further below is used for the determination of this transformation. The transformation determined in this way which transforms the reduced first image data into the second image data is referred to as D2K'. The transformation D2K' is used in the optimization transformation as first transformation and transforms the first image data into the second color space. The first image data transformed by D2K' are independent from the data input device since this is also true for the second image data. The use of a profile is therefore not necessary. Influences of the data input device (digital scanner) are minimized or removed by the transformation D2K'.

The correction transformation as part of the optimization transformation is, as already described in FIGS. 1 and 2, obtained from the second image data. The first image data corrected by the correction transformation are than transformed back into the first color space by the transformation K2D known from FIG. 1 and thereby complete the optimization transformation.

The remaining components apparent from FIG. 3 were already described in connection with FIGS. 1 and 2 so that a further description can be omitted.

The optimization transformation OT of the hybrid system can be described by the following equation:

$$OT = K2D \times CDC \times CNT \times D2K'$$

Figure 4:
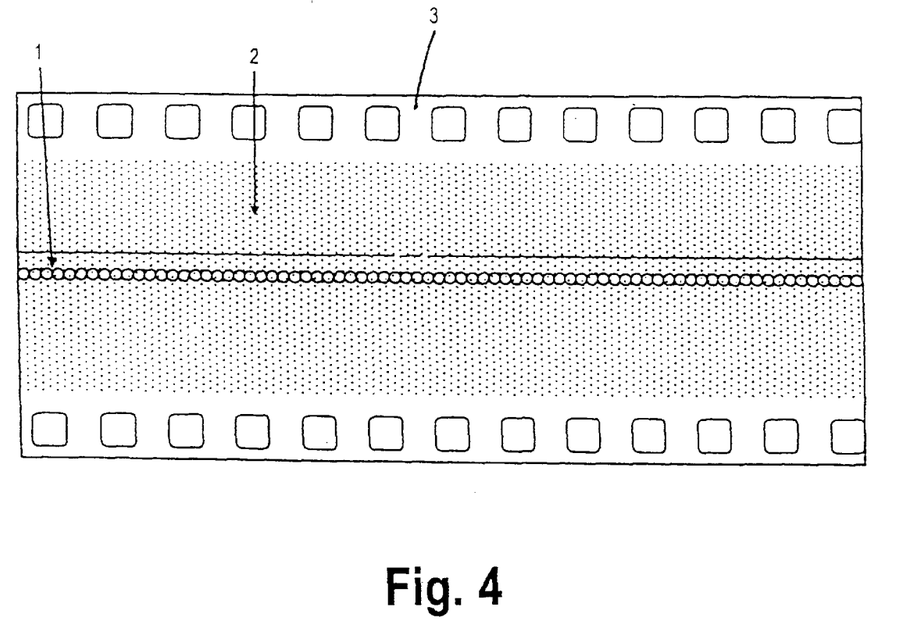
FIG. 4 illustrates the determination of test image data.

The determination of the matrix describing the transformation D2K' through adaptation in different color spaces of the reduced first image data and the second image data is described in the following by way of FIG. 4. The adaptation is preferably carried out in such a way that first test image data are selected from the first image data and second test image data are selected from the second image data. FIG. 4 shows an example therefor. A film 3 is scanned by way of the spectral scanner and the digital scanner. The measurement points of the digital scanner are indicated by points 2. The spectral scanner has a coarse spatial resolution which is indicated by small circles. From the second image data obtained thereby those data are selected as second test image data which are preferably located at about the center of the film and are indicated as circles 1 on FIG. 4. Thus, a multitude of first image data 2 are assigned to a circle 1, which originate from the same film region. It has proven sufficient when the number of the second test image data (circles in FIG. 4) is between two and four orders of magnitude, preferably at about three orders of magnitude (about 1000). Preferably, the second test image data are obtained from at least a part of the images of a set of images or the film. Thus, the circles lined up in FIG. 4 can extend across the whole film. The regions in which the test image data are obtained, i.e. the circles shown in FIG. 4, are in the following referred to as locations. The second test image data are described in the second color space by the coordinates $klt_0, klt_1, klt_2$. Each test image data point is associated with a specific location i, which is again associated with a number of first test image data, which are described by the coordinates $(rgb_0, rgb_1, rgb_2)$.

In the above-mentioned manner, test vectors vi are described as follows for each location i:

$$vi = (klt_0, klt_1, klt_2, rgb_0, rgb_1, rgb_2, 1)$$

In the above mentioned equation, "rgb" respectively represents the average overall first image data at the location i which is defined, for example by a circle shown in FIG. 4. If KLT is a Karhunen-Loève-Transfornation, $klt_0, klt_1, klt_2$ describe the first three coefficients of the data transformed by way of the Karhunen-Loève-Transformation, which data were output by the spectral scanner.

Once to test vectors were determined in the above manner for wall locations i, weights are then preferably calculated for the individual vectors:

$$w = 1/sig^2$$

"sig" thereby defines the standard deviation of the rgb coordinates of an image data point from the coordinates $rgb_0, rgb_1, rgb_2$ at the location i averaged overall image data.

In the next step, the correlation matrix is accumulated. The latter has a dimension of 7*7. The correlation matrix CM is calculated as follows:

$$CM = \Sigma w_i * v_i * v_i^T$$

The summation takes place for all test locations, preferably along the film center line shown in FIG. 4. The multiplication $v_i * v_1^T$ results in a matrix.

D2K' and K2D' are then calculated in the next step. The matrices corresponding to these transformations can be obtained from CM, in that sub matrices are extracted. The following equation is used for generating $klt_j$ (j=0,1,2) as a function of the rgb values:

$$klt_j = D2K'_{j0} * rgb_0 + D2K'_{j1} * rgb_1 + D2K'_{j2} * rgb_2 + D2K'_{j3}$$

A submatrix $CM_{KLTj}$ with a dimension of 5*5 is obtained from the lines and columns j,3,4,5,6 of CM. This matrix is inverted in order to obtain $IM_{KLTj}$:

$$IM_{KLTj} = CM_{KLTj}^{-1}$$

The components of the matrix D2K' then result as follows:

$$D2K'_{j0} = -IM_{01}/IM_{00}$$

$$D2K'_{j1} = -IM_{02}/IM_{00}$$

$$D2K'_{j2} = -IM_{03}/IM_{00}$$

$$D2K'_{j3} = -IM_{04}/IM_{00}$$

In order to calculate $rgb_j$ (=0,1,2) as a function of KLT, the following equation is used:

$$rgb_j = K2D'_{0j} * klt_0 + K2D'_{1j} * klt_1 + K2D'_{2j} * klt_2 + K2D'_{3j}$$

The sub matrix $CM_{RGBj}$ is subsequently extracted which has a dimension of 5*5, and from the columns and rows j + 4,1,2,3,6 of CM. This matrix is inverted:

$$IM_{RGBj} = CM_{RGBj}^{-1}$$

The components of the matrix K2D' are obtained therefrom:

$$K2D'_{0j} = -IM_{01}/IM_{00}$$

$$K2D'_{1j} = -IM_{02}/IM_{00}$$

$$K2D'_{2j} = -IM_{03}/IM_{00}$$

$$K2D'_{3j} = -IM_{04}/IM_{00}$$

In the ideal case, the matrix product D2K'* K2D' results in the unit matrix. This is then the case a when the second test image data and the associated first test image data originate from exactly the same location i and therefore a perfect local congruence exists, although the film was scanned by,two different scanners. It is a further condition that a linear relationship exists between the first color space and second color space. In reality, the matrix product provides a measure for the good local congruence or the positional relationship between the first and second test image data. This measure can be compared with an r-factor in the linear regression and can be used to determine a systematic position offset or local offset between the two scanners. For that, the above described calculation by way of the test vectors and the matrix CM and so on is best carried out for different positional offsets and that matrix D2K' selected, for which based on the matrix product D2K'* K2D' results the best congruence.

Figure 5:
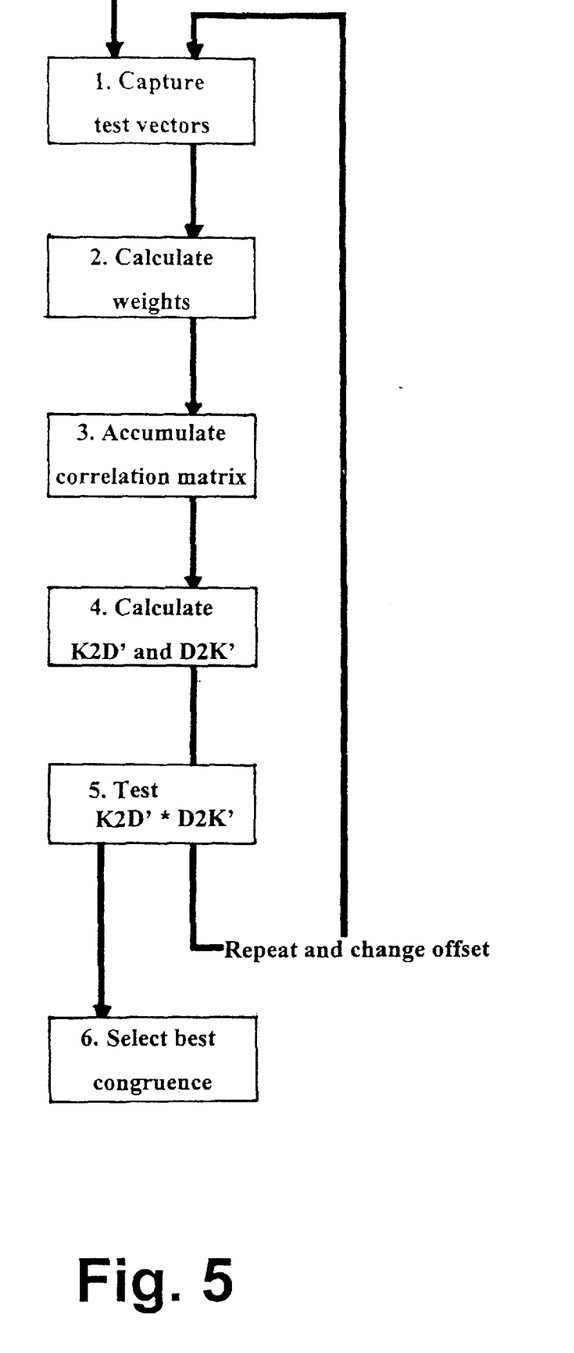
FIG. 5 shows a process for the improvement of the position matching.

It is schematically illustrated in FIG. 5 how such a process can be carried out. Once the positional offset it is determined by iteration, it can be used as starting value for the processing of the next film.

The disclosures of EP 0 586 773 A1 and U.S. Pat. No. 5,365,353 are herewith incorporated into the description.

What is claimed is:

1. Optimization apparatus for photographic image data, comprising:
   a data input device for the input of first image data which are present in a first color space and represent a photographic image or a set of photographic images,
   an optimization device for the optimizing the first image data, and
   a data output device for the output of the optimized first image data, which optimized first image data represent the photographic image or set of photographic images,
   wherein the optimization device carries out an optimization transformation on the first image data, the optimization transformation corresponding to a combination of at least the following transformations:
   a first transformation which transforms the first image data from the first color space into another, second color space,
   a correction transformation which corrects the first image data in the second color space, the correction transformation being based on the analysis of second image data which are present in the second color space and which are distinguished from the first image data transformed by the first transformation, wherein the second image data represent an image with substantially lower local resolution than the first image data, and
   a second transformation which transforms the corrected first image data into a third color space.

2. Optimization apparatus for photographic image data, comprising:
   a data input device for the input of first image data which are present in a first color space and represent a photographic image or a set of photographic images,
   an optimization device for the optimizing the first image data, and
   a data output device for the output of the optimized first image data, which optimized first image data represent the photographic image or set of photographic images,
   wherein the optimization device carries out an optimization transformation on the first image data, the optimization transformation corresponding to a combination of at least the following transformations:
   a first transformation which transforms the first image data from the first color space into another, second color space,
   a correction transformation which corrects the first image data in the second color space, the correction transformation being based on the analysis of second image data which are present in the second color space and which are distinguished from the first image data transformed by the first transformation, the second image data being obtained from the first image data, whereby the data volume of the first image data is reduced therefor with loss and a transformation from the first color space to the second color space is carried out, and
   a second transformation which transforms the corrected first image data into a third color space.

3. Optimization apparatus according to claim 2, wherein the first transformation is a compensation transformation which transforms the reduced first image data into the second color space, whereby the compensation transformation is based on a statistical analysis of reduced first image data, which reflect the multitude of the images and/or sets of images input through the data input device, and whereby the compensation transformation at least about compensates for a color value variance property of the data input device.

4. Optimization apparatus according to claim 2, wherein the first image data are changed in the first color space according to a preselected correlation rule which is based on measured color value variance properties of the data input device, whereby the change takes place before the execution of a reduction of the first image data and whereby the changed and reduced image data are transformed by a color space transformation into the second color space where they represent the second image data.

5. Optimization apparatus for photographic image data, comprising;
  a data input device for the input of first image data which are present in a first color space and represent a photographic image or a set of photographic images,
  an optimization device for the optimizing the first image data, and
  a data output device for the output of the optimized first image data, which optimized first image data represent the photographic image or set of photographic images,
  wherein the optimization device carries out an optimization transformation on the first image data, the optimization transformation corresponding to a combination of at least the following transformations:
    a first transformation which transforms the first image data from the first color space into another, second color space,
    a correction transformation which corrects the first image data in the second color space, and
    a second transformation which transforms the corrected first image data into a third color space,
  wherein the first transformation is determined by way of first and second test image data, whereby the first test image data are present in the first color space and the second test image data are present in the second color space and the first transformation is determined such that after the transformation of the first test image data into the second color space deviations of the transformed first test image data from the not transformed second test image data are minimized, and wherein the first test image data and the second test image data are generated from at least a part of the photographic image or the set of photographic images which is or are represented by the first image data, whereby color values of the photographic image or the set of photographic images are statistically analyzed for the determination of the second test image data.

6. Optimization apparatus according to claim 5, wherein a first reverse transformation for the transformation of the second test image data into the first color space is determined such that after the reverse transformation of the second test image data into the first color space deviations of the transformed second test image data from the not transformed first test image data are minimized and that the quality of the first transformation is tested through the result of a matrix product of two matrices and the test result is used especially for the optimization of the first transformation, whereby one of the two matrices represents the first transformation and the other matrix represents the first reverse transformation.

7. Photographic copier with an optimization apparatus according to claim 6 and an image reproduction device connected with the data output device for the production of images on an output medium, based on the optimized first image data.

8. Optimization process for optimizing photographic image data, especially by use of the optimization apparatus according to claim 6, comprising the following steps:
  receiving first image data through a data input device which are present in a first color space and which represent a photographic image or a set of photographic images,
  subjecting the received first image data to an optimization transformation in order to generate optimized first image data,
  whereby the optimization transformation includes at least a combination of the following transformations:
    a first transformation which transforms the first image data from the first color space into another, second color space,
    a correction transformation which corrects the first image data in the second color space, and
    a second transformation which transforms the corrected first image data into a third color space, and
  output of the optimized first image data which represent the photographic image or the set of photographic images through a data output device.

9. Program which when executed on a computer or loaded into a computer causes the computer to carry out the process according to claim 8.

10. Computer program product, especially a storage medium for a computer program, which includes the program according to claim 9.

* * * * *

UNITED STATES PATENT AND TRADEMARK OFFICE
CERTIFICATE OF CORRECTION

PATENT NO.    : 6,498,638 B1                                              Page 1 of 1
DATED         : December 24, 2002
INVENTOR(S)   : Peter Zolliker et al.

It is certified that error appears in the above-identified patent and that said Letters Patent is hereby corrected as shown below:

<u>Title page,</u>
Item [73], Assignee, "Gretag ImagingTrading AG" should read
-- Gretag Imaging Trading AG --.

Signed and Sealed this

Twentieth Day of January, 2004

JON W. DUDAS
*Acting Director of the United States Patent and Trademark Office*